United States Patent

[11] 3,623,447

[72] Inventor Clayton J. Jacobson
5403 Seacrest Drive, Rolling Hills, Calif. 90274
[21] Appl. No. 4,631
[22] Filed Jan. 21, 1970
[45] Patented Nov. 30, 1971

[54] POWERED AQUATIC VEHICLE
9 Claims, 9 Drawing Figs.
[52] U.S. Cl. .................................................. 115/70, 115/12
[51] Int. Cl. .................................................. A63h 5/08, B63h 11/00
[50] Field of Search ...................................... 115/6.1, 70, 12

[56] References Cited
UNITED STATES PATENTS
3,426,724  2/1969  Jacobson.................. 115/70

*Primary Examiner*—Trygve M. Blix
*Attorney*—William C. Babcock

ABSTRACT: A low-draft hydroplanelike vehicle having a hull of stable design that is power driven by a jet of water, the direction of which jet may be varied by the operator to steer the vehicle. The jet of water is automatically maintained in a substantially horizontal direction to provide a flat thrust in turns even when the vehicle is laterally tilted to a substantial degree. Maintenance of the jet in a substantially horizontal direction due to the geometry of movement of the nozzle from which it is ejected provides maximum forward drive to the vehicle and a minimum tendency for the stern of the vehicle to lift from the water during a tight turn. Upward movement of the stern relative to the water results in the vehicle momentarily being in an unstable condition in which the operator is frequently thrown therefrom. The vehicle is of such design that water will not enter the engine compartment or flood the exhaust in the event the vehicle capsizes, or when the vehicle is stationary.

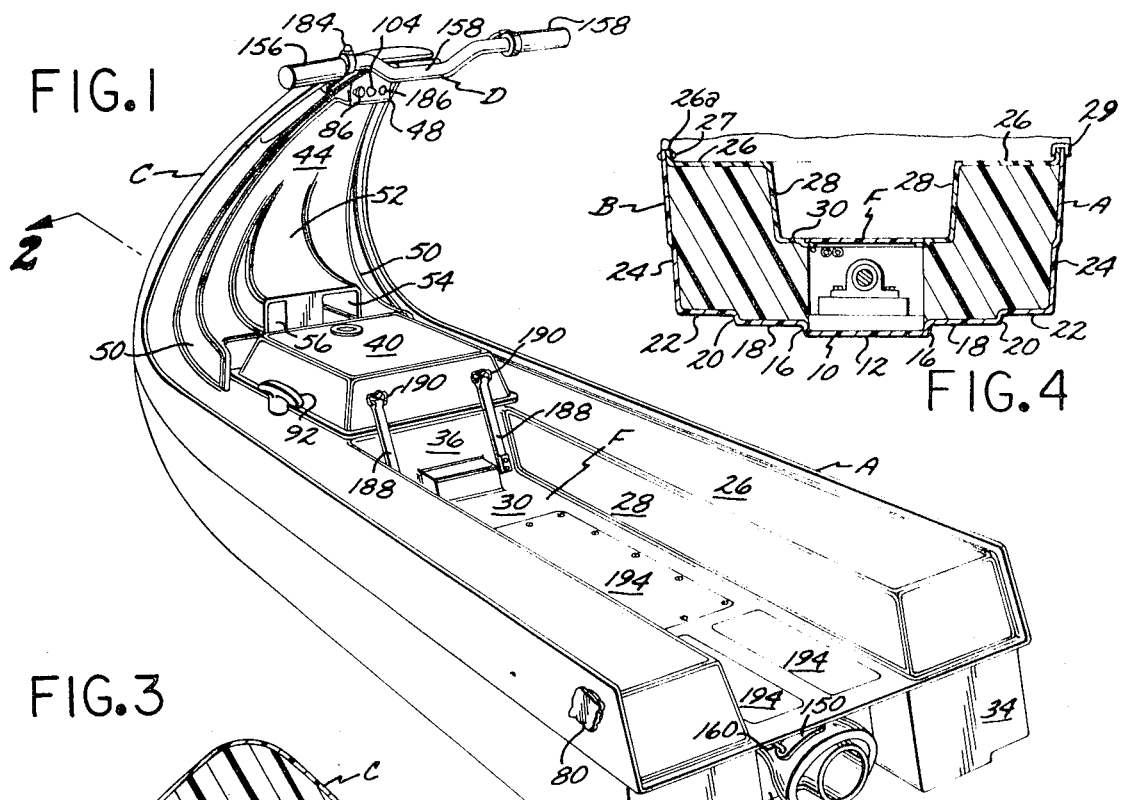
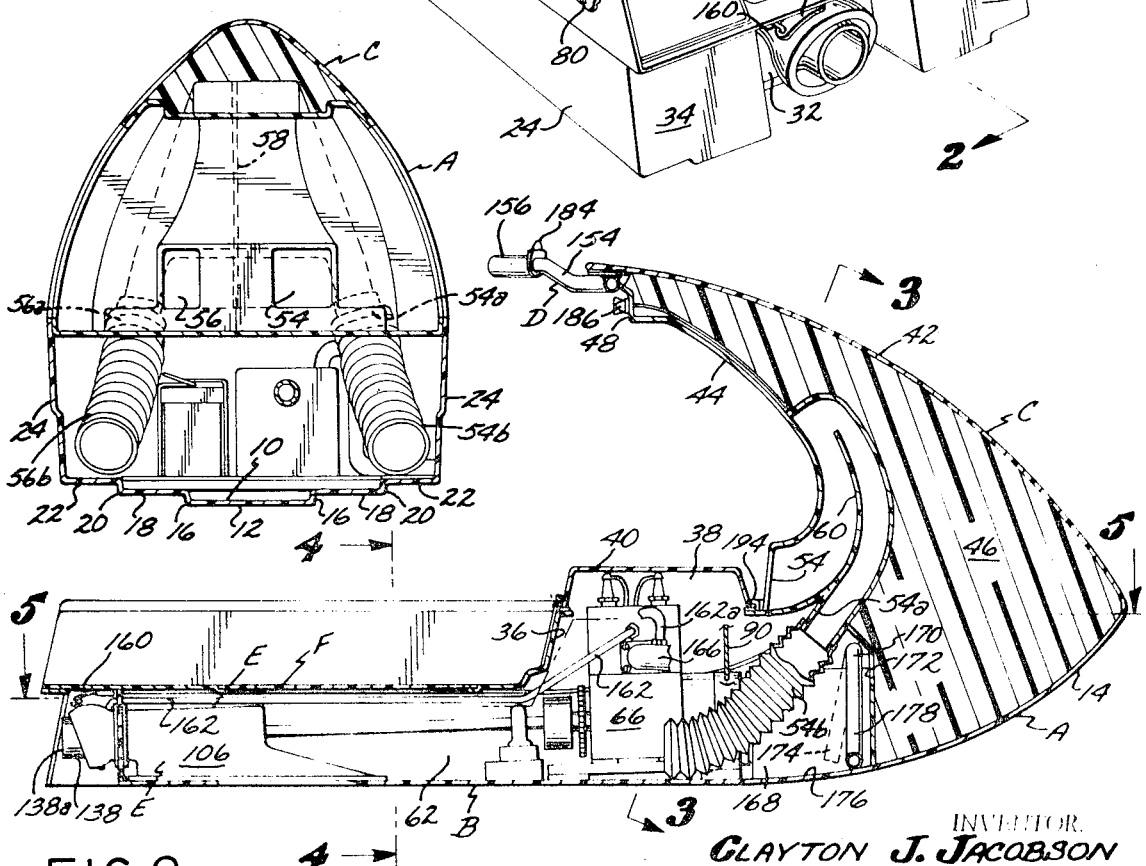

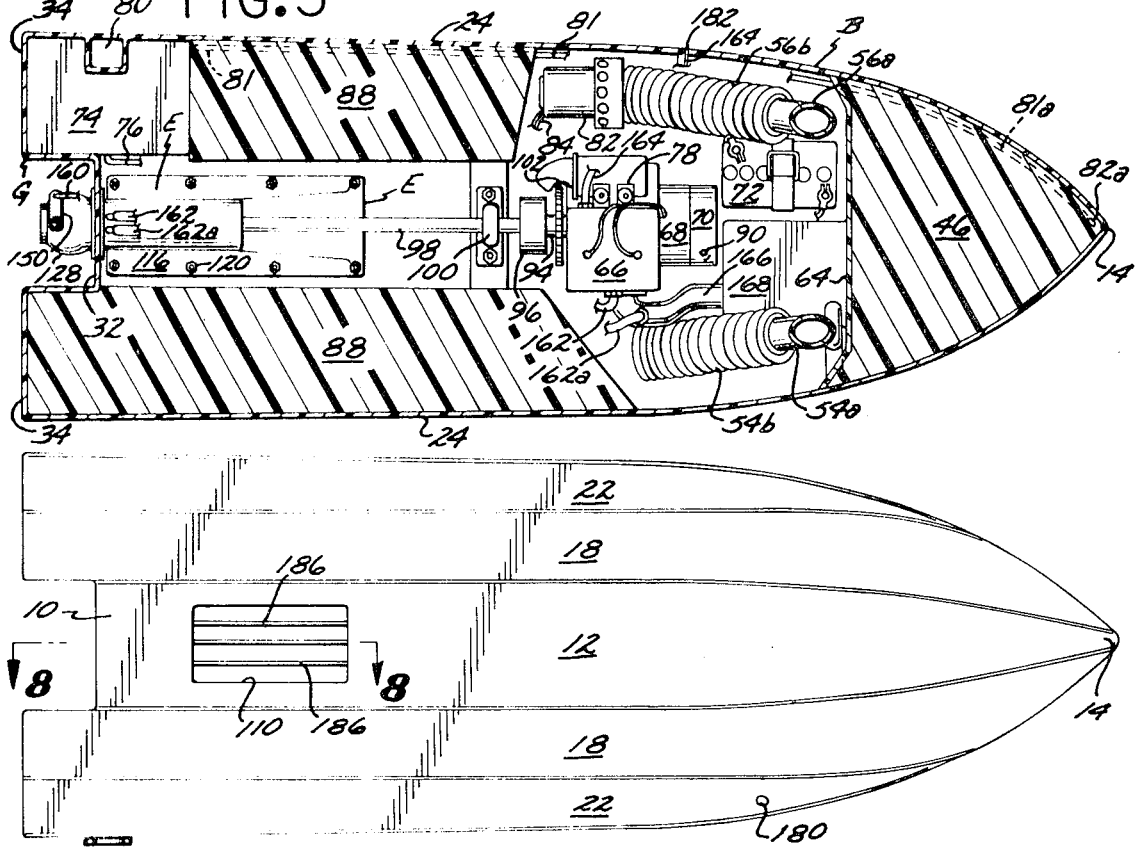
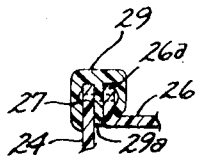
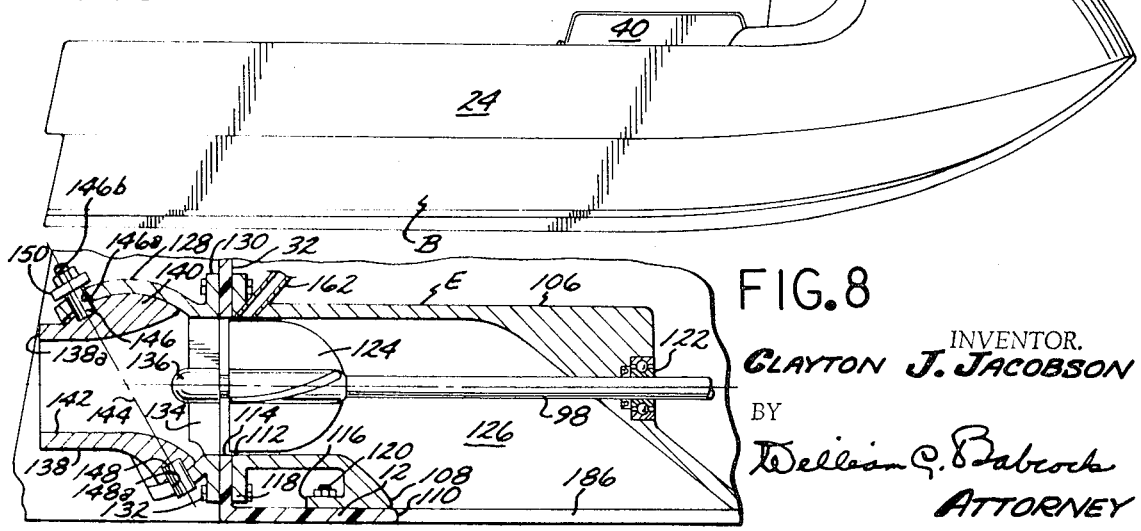
INVENTOR.
CLAYTON J. JACOBSON
BY
William G. Babcock
ATTORNEY

3,623,447

POWERED AQUATIC VEHICLE

CROSS-REFERENCE TO RELATED APPLICATION

Marine Vehicle Steering Assembly executed by applicant on Nov. 14, 1969, and field in the U.S. Patent Office on or about Nov. 18, 1969 as application Ser. No. 877,785.

BACKGROUND OF THE INVENTION

1. Field of the Invention

A water-jet-driven aquatic vehicle that is operated by the user in a standing position, with the direction of the driving jet being so controlled that the vehicle has a high degree of stability in negotiating a sharp turn. The vehicle is not only safe to use and operate, but is impervious to the flooding of the engine compartment and exhaust if it should capsize, as well as when heavily loaded and in a stationary position.

2. Description of the Prior Art

Various types of water-jet-driven aquatic vehicles have been devised and used in the past, with the jet also being used to steer the vehicle. This type of vehicle has the operational disadvantage that when it is put in a tight turn, the vehicle tilts laterally, and the jet is directed downwardly. The downwardly directed jet tends to lift the stern of the vehicle from the water, resulting in the vehicle being momentarily in an unstable condition where it either overturns, or the bow portion thereof noses into the water, either of which contingencies can throw the operator from the vehicle. The present water jet driven vehicle overcomes the operational disadvantages of prior art devices of this nature.

SUMMARY OF THE INVENTION

A low-draft water-jet-driven vehicle which the user operates when in a standing position, and the position of the jet being maintained substantially horizontal at all times to permit a tight turn to be negotiated with maximum forward thrust and a minimum tendency for the vehicle to go into an unstable operating condition where it is difficult if not impossible to control.

A major object of the present invention is to provide a low-draft hydroplanelike vehicle that is of simple mechanical structure, has a high degree of stability due to the hull design thereof, is safe to use, will not flood if it is inadvertently overturned in the water, is operable with a maximum forward thrust on turns as well as straightway runs, and high operable stability irrespective of the path in which it may be traveling.

BRIEF DESCRIPTION OF THE DRAWINGS

FIG. 1 is a perspective view of the low-draft water-jet-driven and guided aquatic vehicle;

FIG. 2 is a longitudinal cross-sectional view of the device taken on the line 2—2 of FIG. 1;

FIG. 3 is a transverse cross-sectional view of the device taken on the line 3—3 of FIG. 2;

FIG. 4 is a second transverse cross-sectional view of the device taken on the line 4—4 of FIG. 2;

FIG. 5 is a longitudinal cross-sectional view of the device taken on the line 5—5 of FIG. 2;

FIG. 6 is a bottom plan view of the device;

FIG. 7 is a side elevational view of the device;

FIG. 8 is a fragmentary longitudinal cross-sectional view of the device taken on the line 8—8 of FIG. 6; and FIG. 9 is an enlarged transverse cross-sectional view of a side portion of the hull at the junction thereof with the deck.

DESCRIPTION OF THE PREFERRED EMBODIMENTS

The aquatic vehicle A as may best be seen in FIGS. 1 to 4 includes an elongate hull B that develops on its forward end into a combined bow and upwardly and rearwardly extending portion C that supports the control mechanism D. The vehicle A is driven and steered by a water-jet-generating mechanism E the details of which are shown in FIGS. 5 and 8, which mechanism is located at the stern of the vehicle A.

Hull B is preferably formed from a fiber glass shell or like lightweight material, and as may best be seen in FIGS. 4 and 6 includes a bottom 10 that is defined by an elongate longitudinally extending center section 12 that terminates at the forward end thereof in a curved upwardly extending bow 14. Center section 12 develops on the longitudinal sides thereof into two upwardly extending first ribs 16 that merge with two laterally spaced first bottom sections 18. First bottom sections 18 extend rearwardly substantially greater distances than the center section 12 as shown in FIG. 6. The outer longitudinal edges of first bottom sections 18 develop into second upwardly extending ribs 20 that merge into second laterally spaced bottom sections 22. The first and second bottom sections merge on their forward ends into the bow 14.

The outer longitudinal edges of the second bottom sections 22 develop into two upwardly extending sidewalls 24 that merge on their forward ends into the bow and the forward hull portion C. A longitudinally extending deck F is provided as may best be seen in FIG. 4 that is secured to the upper interior surfaces of sidewalls 24. Deck F includes two first elongate longitudinally extending first sections 26 that merge on their inner edges into two downwardly extending walls 28 that on their lower edges develop into a central deck section 30.

Deck sections 26 on their outer edges develop into upwardly extending flanges 26a that are adjacently disposed to the upper interior surfaces of sidewalls 24 as shown in FIGS. 4 and 9. Flanges 26a and sidewalls 24 are secured to one another by rivets 27. A strip 29 of waterproof material envelopes flanges 26a, rivets 27, and the upper portions of sidewalls 24. Strip 29 is of generally inverted U-shaped transverse cross section, and includes a tab 29a that is disposed between the flange 26a and sidewall 24 as shown in FIG. 9.

The stern G of the vehicle A as may best be seen in FIG. 5 is defined by walls 32 and 34 that extend upwardly from the rearward ends of the center section 12 and first and second bottom sections 18 and 22 respectively. Center deck section 30 on its forward end develops into an upwardly extending wall 36 that cooperated with walls 28 to define a hatch 38 that is normally closed by a cover 40 as shown in FIGS. 1 and 2.

The forward portion C of vehicle A as may best be seen in FIGS. 1 and 2 is defined by two curved upwardly and rearwardly extending walls 42 and 44 that define a space therebetween that is filled with a body 46 of buoyant material such as a foamed resin or the like. Walls 42 and 44 at their upper ends are connected by a control panel 48 as shown in FIG. 2.

Rear wall 44 has two laterally spaced curved reinforcing ribs 50 projecting rearwardly therefrom, and also includes a walled structure 52 that defines an air intake passage 54 and air exhaust passage 56. Air intake passage 54 and discharge passage 56 are separated by a partition 58 situated in structure 52 as shown in FIG. 3. Each passage 54 and 56 in structure 52 is provided with a baffle 60 to prevent water inadvertently entering the passages and flowing into the engine compartment 62 defined between the hull B and deck F as shown in FIG. 2. The passages 54 and 56 defined in structure 52 develop into tubular members 54a and 56a that are connected to flexible corrugated conduits 54b and 56b that extend to space 62 as shown in FIG. 3.

The forward extremity of engine compartment 62 is defined by a transverse partition 64 in hull B as shown in FIG. 5. An internal combustion engine 66 is located in compartment 62 in such a position as to be readily accessible for repair and maintenance work when the hatch cover 40 is removed from the position shown in FIG. 1. The engine 66 includes a magneto and alternator assembly 68 as well as a recoil starter 70 as may best be seen in FIG. 5. A storage battery 72 is located in the engine compartment 62 forwardly and to the left of engine 66 as viewed in FIG. 5.

A fuel tank 74 is located in the stern portion of hull B as shown in FIG. 5, and has a fuel supply line 76 extending forwardly therefrom to a carburetor assembly 78 of engine 66. Hull B has a fuel filling assembly 80 for tank 74 provided in the stern portion thereof as may best be seen in FIGS. 1 and 5. Fuel tank 74 has a vent line 81 extending forwardly therefrom to the bow 14. The inlet 81a to vent line 81 is so located near bow 14 that should the vehicle A overturn and be floating on its side, the inlet will be sufficiently high above the water surface that no water will enter the vent line to flow rearwardly therein and contaminate the fuel in tank 74.

An explosionproof electrically operated blower 82 is located in engine compartment 62 as may best be seen in FIG. 5, and is connected by an electric circuit 84 to battery 72 and a normally open electric switch 86 mounted on panel 48 as may best be seen in FIG. 1. The discharge from blower 82 is connected to conduit 56b. When switch 86 is manually closed for a short period of time, the blower 82 is actuated to discharge air and any accumulated gasoline fumes from the engine compartment 62 to the ambient atmosphere through the discharge outlet 56.

Two laterally spaced, longitudinally extending bodies 88 of a buoyant material such as a foamed plastic are situated in the interior side portions of hull B as shown in FIG. 5 to reduce the volume of the engine compartment 62. The less the volume of compartment 62, the less will be the time required for the blower 82 to purge the compartment of any gasoline fumes that may have accumulated therein. Recoil starter 70 has a starting rope 90 connected thereto, which rope has a handle 92 on the upper end thereof as shown in FIG. 1.

Engine 66 has a drive shaft 94 extending rearwardly therefrom to a centrifugal clutch 96. A second drive shaft 98 extends rearwardly from clutch 96 to the water-jet-generating assembly E as best seen in FIG. 5. Second drive shaft 98 is journaled in a bearing block assembly 100 that is secured by conventional means to the bottom 10 of hull B. An engine starting sprocket 102 is secured to first drive shaft 94 and is actuated by a starting motor (not shown) that is powered by battery 72. A normally open electric switch 104 is mounted on panel 48. When switch 104 is manually closed the starting motor (not shown) is electrically energized, and drives the shaft 94 to start engine 66. The engine 66 should be started only after the blower 82 has been actuated to purge all gasoline fumes from compartment 62. The recoil starter 70 will be used only if the electrically operated starter (not shown) is inoperative.

The water-jet-generating assembly E as shown in FIG. 8 includes an elongate housing 106 that is situated in the interior stern portion of hull B. The housing 106 has a water intake opening 108 that is in communication with an elongate opening 110 formed in the central section 12. Housing 106 also includes a rearward opening 112 that is in communication with an opening 114 formed in wall 32 as shown in FIGS. 5 and 8. Housing 106 includes flanged portions 116 and 118 that are in abutting contact with central section 12 and wall 32 respectively, and in sealing contact therewith. Gaskets (not shown) may be used to effect such seals. Flanged portion 116 is secured to center section 12 by bolts or screws 120. A bearing 122 is positioned in the forward portion of housing 106 and rotatably supports drive shaft 98.

A propeller 124 is rigidly secured to second drive shaft 98. The propeller 122 is disposed in the rearward portion of a passage 126 in housing 106, which passage extends between openings 108 and 112 as shown in FIG. 8. A truncated spherical shell 128 is disposed rearwardly of the center portion of wall 32 and in alignment with opening 114. The shell has a forwardly disposed flange 130 formed as a part thereof. Flange 130 abuts against the rearward surface of wall 32. The flange 130 and flanged portion 118 are held in abutting contact with wall 32 by bolts 132 as shown in FIG. 8. A spider 134 is situated in the interior forward portion of shell 128 and supports a bearing 136 in which the rearward portion of second shaft 98 is journaled.

A nozzle 138 is provided that has an enlarged forward portion 140 that defines a segment of a sphere. The enlarged portion 140 is pivotally supported within the confines of shell 128 as shown in FIG. 8. Nozzle 138 has a bore 142 extending longitudinally therethrough, with the forward portion 142a thereof being of decreasing transverse cross section.

Nozzle 138 pivots on an axis 144 that extends downwardly and forwardly through shell 128. Two oppositely disposed pins 146 and 148 are secured to nozzle 128 and aligned on axis 144. The pins 146 and 148 are journaled in bores 146a and 148a formed in shell 128.

The upwardly disposed pin 146 includes a threaded shank 146b that defines a body shoulder with the lower portion of the pin. An apertured lever 150 is mounted on shank 146b and extends outwardly therefrom. Lever 150 is held in a nonrotatable position on shank 146b and in abutting frictional contact with the body shoulder by a nut 152.

The control mechanism D includes a handlebarlike structure 154 best seen in FIG. 1 that has two laterally spaced spring-loaded rotatable handles 156 and 158 mounted thereon. Rotation of handle 156 actuates a cable 160 by conventional means (not shown), which cable is pivotally connected to an outer end portion of lever 150 as shown in FIG. 1. When handle 156 is rotated the nozzle 138 is pivoted relative to shell 128, with the discharge end 138a of the nozzle moving through an arcuate path. Handle 158 by rotation controls flow of fuel to engine 66 from tank 74 by conventional means (not shown).

A cooling water supply tube 162 best seen in FIGS. 2 and 8 is connected to the interior portion of housing 106 adjacent to propeller 124 and engine 66. Cooling water supplied to engine 66 is discharged therefrom through a tube 164 illustrated in FIG. 5. Engine 66 has an exhaust discharge manifold 166 extending therefrom to the upper portion of a muffler box 168 that is located inside hull B forwardly and to the right of the engine 66 as viewed in FIG. 5. A tube 162a extends from the upper interior portion of housing 106 adjacent to propeller 124 and manifold 166. Tube 162a supplies water to the interior of the manifold 166 to cool the exhaust gases discharging therethrough from engine 66 to muffler box 168.

An inverted U-shaped exhaust tube 170 is sealingly connected to a top 172 of muffler box 168. One leg 174 of tube 170 extends downwardly inside box 168 to a position adjacent to the bottom 176 thereof. The other leg 178 of tube 170 extends downwardly inside to hull B and is connected to a discharge port 180 therein. The cooling water discharge tube 164 terminates in a port 182 formed in the side of hull B opposite that in which port 180 is formed as shown in FIG. 5. An ignition switch 184 is provided on the control mechanism D, and permits the electric circuit 84 to be completed, only when switch 184 is in a closed position.

A manually operated choke 186 is mounted on panel 48 and is used in the starting of engine 66. Two resilient straps 188 have the lower portions thereof secured to wall 36 as shown in FIG. 1. The upper ends of straps are provided with fittings 190 of a conventional design that removably engage the hatch cover 40.

The use and operation of the vehicle A is extremely simple. The hull B is of such width and center of gravity that the vehicle is stable and will tend to remain in an upright position both when stationary as well as when in motion. After a user (not shown) of the vehicle A has mounted the same and is in a standing position thereon, the switch 184 is closed, preferably by a key (not shown) provided for that purpose. Switch 86 is now closed for 15 or 20 seconds to energize blower 82, with the blower discharging air and any accumulated gasoline fumes from the engine compartment 62 through the discharge passage 56 to the ambient atmosphere. During such discharge, air from the ambient atmosphere is drawn into engine compartment 62 through air intake passage 54, member 54a, and conduit 54b.

After gasoline fumes have been purged from engine compartment 62, switch 104 is momentarily closed to start the engine 66. The engine 66 when operating at idling speed drives first shaft 94. As the speed of the engine is increased the second drive shaft 98 and propeller 124 are rotated due to actuation by centrifugal clutch 96. Rotation of the propeller 124 causes a stream of water to move rearwardly through passage 126 and discharge as a high-velocity jet from the nozzle 138. The speed at which the engine operates is controlled by rotation of the handle 158. Rotation of the propeller 124 also causes water to discharge forwardly through tubes 162 and 162a.

The jet of water discharging from nozzle 138 causes the vehicle A to be driven forwardly. Guiding of the vehicle A is achieved by rotating the handle 156 to pivot the nozzle 138 relative to the shell 128. Due to the downwardly and forwardly tilting axis 144 on which the nozzle 138 pivots, the nozzle 138 swings through an arcuate path. When the vehicle A is caused to travel through a curved path, the vehicle tilts, but due to the angle of the axis 144 the nozzle 138 remains substantially horizontal when the vehicle is in the tilted position. The nozzle 138 due to this horizontal positioning allows the jet of rearwardly discharging water to exert a maximum horizontal thrust on the vehicle, and without the jet tending to cause the stern of the vehicle A to lift from the water and the bow of the vehicle to nose into the water. Thus, the vehicle A remains in a stable controllable position even in a tight turn. Transverse slipping of the vehicle A in a tight turn is minimized due to the resistance offered by the ribs 16 and 20 relative to such transverse movement. Weeds and other debris are prevented from entering the opening 110 by a number of laterally spaced bars 192 that extend longitudinally therein. The angle of the axis 144 is preferably so selected that the nozzle 138 is substantially horizontal when the hull B is transversely tilted to the maximum angle it will assume in traversing a tight turn.

When the vehicle A is operating, water is discharged through tube 162 to cool engine 66. Water is also discharged through tube 162a to manifold 166 to cool the exhaust gases discharged therein by engine 66. The cooling water in manifold 166 is discharged with the exhaust gases into muffler box 168. After water has accumulated in muffler box 168 in sufficient quantity to cover the lower end of leg 174, the pressure of the gas discharging into muffler box 168 causes the water therein to discharge through tube 162 and port 180. The vehicle A has sufficient buoyancy that should the vehicle momentarily be disposed on one of its sides on a body of water the passages 54 and 56 will be situated above the surface thereof, and no water will flow into the engine compartment 62. Water has no tendency to flow into muffler box 168 through 178, as the pressure in the box will be greater than that of the ambient atmosphere. Also, leg 178 is of greater length than leg 174 as may be seen in FIG. 2, and no siphon will be established even if the pressure in muffler box 168 is the same as that of the ambient atmosphere.

Hatch cover 40 is pivotally and removably connected on its forward end to hull B by conventional means 194 as may be seen in FIG. 2. Should a user forget to purge the interior of hull B of gasoline fumes, or should an explosion for some other reason occur in engine compartment 62, the resilient straps 188 will allow the hatch cover 40 to pivot upwardly and forwardly to relieve the excess pressure in hull B without doing damage to the latter. After the excess pressure in the hull B has been relieved, the resilient straps 188 will automatically return the hatch cover to the position shown in FIG. 1. Deck F preferably has one or more pads 194 of an antislip material removably secured to the upper surface thereof as shown in FIG. 1.

I claim:

1. A power-driven aquatic vehicle that is operated by a user when in a standing position thereon, said vehicle including:
   a. an elongate hollow hull that is defined by a bottom, stern, sidewalls and upwardly extending forward and rearward spaced walls that partially define a bow portion of said hull, said bottom including a longitudinal center section and at least one pair of longitudinal side sections on opposite sides of said center section, and a panel supported from the upper extremities of said forward and rearward walls;
   b. an internal combustion engine mounted in said hull said engine including a discharge manifold;
   c. a deck mounted on said hull and cooperating therewith to define an engine-containing compartment, said deck having a hatch opening therein through which access may be had to said engine;
   d. an air exhaust and air intake structure in said bow portion that are in communication with the ambient atmosphere and said compartment, said structure having air discharge and air intake openings in said rearward wall that are so positioned as to be above the surface of a body of water when said hull is floating in a sidewise position thereon;
   e. an electrically operated blower in said engine compartment, with the discharge from said blower connected to said air exhaust;
   f. a muffler box assembly in said engine compartment connected to said manifold, said muffler box including an inverted generally U-shaped exhaust tube that has a first leg that extends downwardly through a top of said box to a position adjacent to the bottom thereof, and a second leg that is connected to a port formed in one of said sidewalls;
   g. a pivotally movable nozzle assembly disposed rearwardly of a center portion of said stern;
   h. first means in said hull that is powered by said engine for drawing water through an opening in said bottom and directing said withdrawn water as a high-velocity jet through said nozzle to drive said vehicle forwardly, and said jet when said nozzle is pivoted guiding said vehicle;
   i. a hatch cover pivotally connected to said deck and extending across said opening in said deck;
   j. resilient means for holding said hatch cover in a closed position on said deck;
   k. a battery in said engine compartment;
   l. second means for starting said engine from the exterior of said hull;
   m. third means for discharging water from said first means to said manifold to cool the exhaust gases from said engine discharging therethrough, said water and exhaust gases concurrently discharging into said muffler box, and said water in said muffler box discharging through said exhaust tube when the water level in said box rises above the lower end of said first leg;
   n. a vented fuel tank assembly in said engine compartment, which assembly is connected to said engine;
   o. at least one buoyant body in said engine compartment to minimize the volume of air therein that may be contaminated with fumes of fuel from said engine to form an explosive mixture;
   p. electric circuit means connecting said battery, electrically operated blower and the ignition of said engine;
   q. a first normally open electric switch forming a pair of said circuit, said first switch when closed completing a circuit to said blower to activate the same and purge said engine compartment of air and fuel fumes;
   r. a second normally open electric switch forming a part of said circuit, said second switch when closed completing a circuit to said engine to permit the operation thereof; and
   s. control means adjacent to said panel for controlling the rate of flow of fuel to said engine and to pivot said nozzle to guide said vehicle, said control means being operable by a user standing on said deck, and said hatch cover should an explosion occur in said engine compartment pivoting upwardly due to said resilient means to relieve the excess pressure therein without doing damage to said hull or deck.

2. An aquatic vehicle as defined in claim 1 in which said central section of said bottom is disposed below said side sections adjacent thereto and connected to said side sections by longitudinally extending ribs that are substantially normal to said deck, with said ribs offering substantial resistance to transverse movement of said hull in a body of water, and said ribs minimizing transverse slippage of said hull in a body of water when said hull is guided through a tight turn.

3. An aquatic vehicle as defined in claim 1 in which a plurality of said buoyant bodies are provided, with a first of said buoyant bodies substantially filling said bow portion, and second and third elongate bodies of said buoyant material being disposed in said engine compartment adjacent to said sidewalls of said hull.

4. An aquatic vehicle as defined in claim 1 in which said fuel tank assembly includes an air vent line that extends to a port in said bow portion, with said port so situated that when said vehicle is floating in a sidewise position on a body of water said port is situated a substantial distance above the surface thereof to prevent water entering said vent line and flowing to said tank to contaminate the fuel therein.

5. An aquatic vehicle as defined in claim 1 which in addition includes:
   t. a first drive shaft connected to said engine and extending rearwardly therefrom;
   u. a centrifugal clutch connected to the rearward end of said first drive shaft; and
   v. a second drive shaft connected to said clutch and to said first means.

6. An aquatic vehicle as defined in claim 5 in which said first means includes:
   w. an elongate housing disposed in said compartment that has a passage extending longitudinally therethrough that is in communication with an opening in said bottom and an opening in said stern, with said second drive shaft journaled in said housing and extending into said passage;
   x. a propeller secured to said second drive shaft, and disposed in a rearward portion of said passage;
   y. a truncated spherical shell mounted on said stern and extending rearwardly therefrom, said shell longitudinally aligned with said opening in said stern;
   z. an enlarged forward portion of said nozzle that defines a spherical segment that is slidably and rotatably supported in said shell;
   aa. two diametrically opposed pins secured to said forward portion that are journaled in said shell on a downwardly and forwardly extending axis to cause the rearward end of said nozzle to swing through an arcuate path when said nozzle is pivoted relative to said shell, with said nozzle remaining substantially horizontal when said hull is in a transversely tilted position as said vehicle is guided through a turn, and said jet of water discharged from said nozzle having a minimum tendency to raise the stern portion of said vehicle from the water to force said vehicle into an unstable position; and
   bb. a lever secured to one of said pins and connected to said control means for pivoting said nozzle relative to said shell to guide said vehicle.

7. An aquatic device as defined in claim 1 in which said center section and side sections of said bottom cooperate to provide a bottom of generally V-shape transverse cross section that provides substantial resistance to transverse slippage of said hull in water as said vehicle is negotiated through a tight turn.

8. An aquatic vehicle as defined in claim 1 in which said side sections of said bottom extend rearwardly a greater distance than said center section and cooperate with walls that define said stern to provide a recess in said hull in which said nozzle is disposed.

9. An aquatic vehicle as defined in claim 1 in which said air discharge opening and air intake openings are laterally spaced from one another, and said air exhaust and air intake structure in addition including baffle means to prevent water from the exterior of said hull flowing through said structure to said engine containing compartment.

* * * * *